US006613819B2

(12) United States Patent
Johnson et al.

(10) Patent No.: US 6,613,819 B2
(45) Date of Patent: Sep. 2, 2003

(54) LIGHT STABLE ARTICLES

(75) Inventors: Stephen A. Johnson, Woodbury, MN (US); Daniel J. McGurran, Woodbury, MN (US); Terry R. Bailey, Woodbury, MN (US); John W. Frank, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 100 days.

(21) Appl. No.: 09/893,200

(22) Filed: Jun. 27, 2001

(65) Prior Publication Data

US 2002/0028862 A1 Mar. 7, 2002

Related U.S. Application Data

(63) Continuation-in-part of application No. 09/548,155, filed on Apr. 13, 2000, now abandoned.

(51) Int. Cl.$^7$ .......................... C08K 5/3492; C08K 5/51
(52) U.S. Cl. ........................ 524/100; 524/99; 524/102; 524/139; 428/480
(58) Field of Search ..................... 524/99, 100, 102, 524/139; 428/480

(56) References Cited

U.S. PATENT DOCUMENTS

| | | |
|---|---|---|
| 540,768 A | 6/1895 | Western |
| 3,124,639 A | 3/1964 | Kahn ............................. 88/65 |
| 3,610,729 A | 10/1971 | Rogers ........................ 350/157 |
| 3,711,176 A | 1/1973 | Alfrey, Jr. et al. .............. 350/1 |
| 3,860,036 A | 1/1975 | Newman, Jr. ................. 138/45 |
| 4,024,206 A | 5/1977 | Fintelmann et al. ......... 260/865 |
| 4,446,305 A | 5/1984 | Rogers et al. ............... 528/348 |
| 4,520,189 A | 5/1985 | Rogers et al. ............... 528/331 |
| 4,521,588 A | 6/1985 | Rogers et al. ............... 528/363 |
| 4,525,413 A | 6/1985 | Rogers et al. ............... 428/212 |
| 4,720,426 A | 1/1988 | Englert et al. ............... 428/344 |
| 5,188,760 A | 2/1993 | Hikmet et al. ............ 252/299.01 |
| 5,211,878 A | 5/1993 | Reiffenrath et al. ..... 252/299.63 |
| 5,235,443 A | 8/1993 | Barnik et al. .................. 359/37 |
| 5,269,995 A | 12/1993 | Ramanathan et al. ........ 264/171 |
| 5,294,657 A | 3/1994 | Melendy et al. ............. 524/270 |
| 5,316,703 A | 5/1994 | Schrenk ....................... 264/1.3 |
| 5,319,478 A | 6/1994 | Fijnfschilling et al. ........ 359/53 |
| 5,389,324 A | 2/1995 | Lewis et al. ................. 264/171 |
| 5,448,404 A | 9/1995 | Schrenk et al. .............. 359/584 |
| 5,486,935 A | 1/1996 | Kalmanash .................... 359/37 |
| 5,486,949 A | 1/1996 | Schrenk et al. .............. 359/498 |
| 5,612,820 A | 3/1997 | Schrenk et al. .............. 359/498 |
| 5,629,055 A | 5/1997 | Revol et al. ..................... 428/1 |
| 5,686,979 A | 11/1997 | Weber et al. .................. 349/96 |
| 5,699,188 A | 12/1997 | Gilbert et al. ............... 359/584 |
| 5,714,530 A | 2/1998 | Waterman ..................... 524/87 |
| 5,721,603 A | 2/1998 | De Vaan et al. ............. 349/194 |
| 5,744,534 A | 4/1998 | Ishiharada et al. .......... 524/442 |
| 5,751,388 A | 5/1998 | Larson ......................... 349/96 |
| 5,767,935 A | 6/1998 | Ueda et al. .................. 349/112 |
| 5,770,306 A | 6/1998 | Suzuki et al. ............... 428/328 |
| 5,783,120 A | 7/1998 | Ouderkirk et al. .......... 264/134 |
| 5,793,456 A | 8/1998 | Broer et al. ................... 349/98 |
| 5,808,794 A | 9/1998 | Weber et al. ................ 359/487 |
| 5,824,465 A | 10/1998 | Marien et al. ............... 430/631 |
| 5,825,542 A | 10/1998 | Cobb, Jr. et al. ........... 359/487 |
| 5,825,543 A | 10/1998 | Ouderkirk et al. .......... 359/494 |
| 5,882,774 A | 3/1999 | Jonza et al. ................. 428/212 |
| 5,940,149 A | 8/1999 | Vanderwerf .................... 349/5 |
| 5,962,114 A | 10/1999 | Jonza et al. ................. 428/212 |
| 5,965,247 A | 10/1999 | Jonza et al. ................. 428/212 |
| 6,103,796 A | 8/2000 | Staniek et al. .............. 524/100 |

FOREIGN PATENT DOCUMENTS

| | | | |
|---|---|---|---|
| DE | 196 30 599 A | 2/1998 | .......... C08L/67/02 |
| EP | 0 982 356 A2 | 3/2000 | .......... C08K/5/353 |
| WO | WO 95/27919 | 4/1995 | .......... G02B/27/28 |
| WO | WO 95/17303 | 6/1995 | ............ B32B/7/02 |
| WO | WO 95/17691 | 6/1995 | ............ G02B/5/30 |
| WO | WO 95/17692 | 6/1995 | ............ G02B/5/30 |
| WO | WO 95/17699 | 6/1995 | ......... G02F/1/1335 |
| WO | WO 96/19347 | 6/1996 | ............ B32B/7/02 |
| WO | WO 97/01440 | 1/1997 | ............ B32B/27/36 |
| WO | WO 97/01774 | 1/1997 | ............ G02B/1/10 |
| WO | WO 99/36248 | 7/1999 | ........... B29C/47/70 |
| WO | WO 99/36262 | 7/1999 | ............ B32B/27/00 |
| WO | WO 99/48685 | 9/1999 | ........... B32B/27/36 |
| WO | WO 99/55772 | 11/1999 | ......... C08K/5/5333 |
| WO | WO 00/45200 | 8/2000 | ............ G02B/5/12 |
| WO | WO 00/64671 | 11/2000 | ........... B32B/27/18 |
| WO | WO 01/26891 A1 | 4/2001 | ............ B32B/7/02 |
| ZA | 979760 | 10/1997 | |

OTHER PUBLICATIONS

Schrenk et al., Nanolayer polymeric optical films, Tappi Journal, pp. 169–174, Jun. 1992.
Ciba Specialty Chemicals, Additives for Specialty Polymers and Products—Key Products Selection Guide.

Primary Examiner—Kriellion A. Sanders

(57) ABSTRACT

The invention provides, generally, light stable article containing at least one single or multiple layer polyester film and an effective amount of a light absorbing composition comprising one or more of an ultraviolet light absorbing compound, a hindered amine light stabilizer (HALS) composition, and a phosphonate stabilizing compound. Generally, the weight ratio of the light absorbing compound to the HALS composition is at least about 2:1. Various composite articles and constructions made utilizing the above light stable articles are also provided.

44 Claims, No Drawings

LIGHT STABLE ARTICLES

This is a continuation-in-part of application Ser. No. 09/548,155, filed Apr. 13, 2000, now abandoned.

FIELD OF THE INVENTION

The present invention relates to light stable articles, including light stable polymeric articles and light stable optical bodies. More particularly, the present invention relates to articles comprised of at least one layer of a polymer film.

BACKGROUND OF THE INVENTION

Polymeric films are widely used and widely useful in a broad range of industrial and consumer applications. Such films, for example, can be employed as transparent or tinted barrier films to protect myriad underlying substrates. Polymeric films, and particularly polymeric films made of a polyester material, offer many characteristics desirable in a barrier film. Among other properties, they exhibit clarity, durability, toughness, pliability, formability and affordability.

Use of some of the most desirable polymeric films, however, can be severely limited for outdoor applications and other applications where the films are exposed to a source of light. For example, many polymeric films degrade when subjected to prolonged exposure to ultraviolet radiation (which occurs naturally during outdoor use or by exposure to fluorescent light or other UV-emitting light source).

There remains, therefore, a desire for articles containing at least one layer of a polymeric film that exhibit improved light stability.

SUMMARY OF THE INVENTION

Briefly, in one aspect, the present invention provides a light stable article that comprises at least one single or multiple layer polyester film and an effective amount of a light absorbing composition comprising an ultraviolet light absorbing compound and a hindered amine light stabilizer (HALS) composition, wherein the weight ratio of the light absorbing compound to the HALS composition is at least, and preferably greater than, about 2:1.

In another aspect, the invention provides a light stable article comprising at least one single or multiple layer polyester film and an effective amount each of a phosphonate stabilizing compound and a light absorbing composition comprising a hydroxy-functional tris-aryl triazine compound.

In yet another aspect, the present invention provides a light stable article comprising at least one single or multiple layer polyester film and an effective amount of a light absorbing composition consisting essentially of a hydroxy-functional tris-aryl triazine compound having the formula:

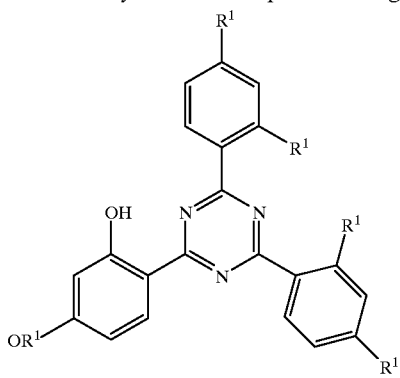

wherein each $R^1$ is the same or different and is selected from the group consisting of hydrogen and substituted or unsubstituted, branched or unbranched alkyl, aryl, or alkaryl groups having from 1 to about 18 carbon atoms. Preferably, the carbon chains of any such alkyl, aryl, or alkaryl group is free of interruption by one or more oxygen atoms and is not substituted by a hydroxy substituent.

In still other respects, the present invention provides various composite articles and constructions made utilizing the above light stable articles.

DETAILED DESCRIPTION OF PREFERRED EMBODIMENTS

The articles of the invention generally comprise at least one single or multilayer polyester (i.e., polyester-containing) film and an effective amount of at least one light stabilizing composition. The light stabilizing composition can comprise an ultraviolet absorbing compound alone or in combination with one or more hindered amine light stabilizing ("HALS") compounds. The polyester film can be oriented and/or can be part of a multilayer optical film construction. The polyester film can also incorporate one or more phosphonate stabilizing compositions to aid in melt stability and/or weather resistance.

The polyester films of the invention can incorporate any polyester-containing polymer. Useful polyester polymers include, for example, polymers having terephthalate, isophthalate, and/or naphthalate comonomer units, e.g., polyethylene naphthalate (PEN), polyethylene terephthalate (PET) and copolymers and blends thereof. Examples of other suitable polyester copolymers are provided in published patent application WO 99/36262 and in WO 99/36248, both of which are incorporated herein by reference. Other suitable polyester materials include polycarbonates, polyarylates, and other naphthalate and terephthalate-containing polymers, such as, for example, polybutylene naphthalate (PBN), polypropylene naphthalate (PPN), polybutylene terephthalate (PBT), polypropylene terephthalate (PPT), and blends and copolymers of any of the above with each other, with other polyesters, or with non-polyester polymers. In a generally preferred embodiment, the light stabilizing compositions are incorporated directly into the polyester resin (e.g., a PET or PEN-based resin). This presents a relatively simple method of effectively, and maximally, protecting standard polyester films from the deterioration upon exposure to sources of ultraviolet radiation. The polymer films can contain multiple layers of the same or different polyester materials, or can be comprised of one or more non-polyester layers.

Most commercially available UV-protected polyester films are made either by applying a UV-protective coating to a polyester substrate, by preparing a multilayered film (as by coextrusion) in which a non-polyester layer contains the UV-protecting agent, or by imbibing a UV-protecting agent into a polyester film after film formation. The current invention can have a significant advantage over such films in that the light stabilizing compositions may be extruded directly in the polyester resin, thus providing simplicity of manufacture, cost reduction, permanence of the light stabilizing additive(s), and uniformity of protection throughout the polyester layer into which the compositions are incorporated.

Polyester films of the invention can be monolayer, bilayer, trilayer or any other non-alternating layered construction. The films can comprise alternating or repeating multi-layer structures, or can include combinations of both. The manufacture of polyester films is well-known in the art, and any of the known methods for forming such films are appropriate to forming the light stabilized articles of this invention. The articles, thus made, can be useful in all applications requiring weatherability, including signing and outdoor protective applications.

Additionally, the polyester films can include or be comprised of a multi-layer optical film. Generally speaking, multi-layer optical films are used to create optical interference filters that reflect light via designed constructive interferences between a multiplicity of layers with alternating low and high indices of refraction. Such films can be composed of either isotropic or birefringement layers, or both. Birefringent optical films are constructed in multi-layer "stacks" for which the Brewster angle (the angle at which reflectance of p-polarized light goes to zero) is controlled to a desired value by control of the relative values of the various indices of refraction in the layers. This property allows for the construction of multilayer mirrors and polarizers whose reflectivity for p-polarized light decreases slowly with angle of incidence, are independent of angle of incidence, or that increases with angle of incidence away from the normal. As a result, multilayer films having high reflectivity (for both s- and p-polarized light for any incident direction in the case of mirrors, and for the selected polarization in the case of polarizers) over a wide bandwidth, can be achieved.

Useful multilayer constructions are disclosed, for example, in the following published patent applications, all of whose descriptions are incorporated herein by reference: WO 95/17303, WO 96/19347, and WO 97/01440. Among the most useful films are multi-layer constructions made of alternating thin layers of PEN and a copolymer of PEN, for example a 70-naphthalate/30-terephthalate co-polyester (co-PEN), or other polymers having a lower refractive index than PEN.

Often, the ability to achieve properties desired in a single or multi-layer polymeric body is influenced by the processing conditions used to prepare it. The polymeric optical body, for example, can be formed by a casting process wherein a molten polymer composition is extruded through a die and cast as a film upon a cooled casting wheel. The desired casting thickness of the cast film will depend in part on the desired use for the optical body, and may be achieved by control of the process conditions under which the body is formed. Typical casting thicknesses range from about 0.3 mm to as much as 3.0 mm, though, depending on the particular end use, thinner or thicker castings can be made.

A cast polymeric body (or film) can optionally be oriented, again depending on the particular set of properties desired. Typically, an oriented body is oriented after a quenching process in either or both the lengthwise (sometimes referred to as machine) direction and the transverse (or cross-machine) direction. Although the degree of orientation in either direction can vary greatly (and are not necessarily the same), typically stretching dimensions vary between 2.5 and 5.0 times the body's cast dimensions. A cast polymeric body can also be heated before or during orientation, e.g., by infrared lamps or forced convection, to raise its temperature to slightly above its glass transition temperature.

When multi-layer optical films are employed, for example, it may be necessary to achieve given relationships among the various indices of refraction (and thus the optical properties) of the multilayer device. In the case of organic polymer films, these properties can be obtained and/or controlled by stretching or orientation. Generally, this is accomplished by preparing the polymer films by co-extruding the individual polymers to form a multilayer film and then orienting the film by stretching at a selected temperature, optionally followed by heat-setting at a selected temperature. Alternatively, the extrusion and orientation steps may be performed simultaneously. In the case of multilayer optical bodies in the form of a polarizer, the multilayer film typically is stretched substantially in one direction (uniaxial orientation). In the case of multilayer optical bodies in the form of a mirror, the film is stretched substantially in two directions (biaxial orientation).

When stretched, the core polymeric body may also be allowed to dimensionally relax in the cross-stretch direction from the natural reduction in cross-stretch (equal to the square root of the stretch ratio) or may also be constrained (i.e., no substantial change in cross-stretch dimensions). The core film may be stretched in the machine direction, as with a length orienter, and in the width direction using a tenter, or at diagonal angles.

It will be understood with respect to such stretching and orientation processes, that the pre-stretch temperature, stretch temperature, stretch rate, stretch ratio, heat set temperature, heat set time, heat set relaxation, and cross-stretch relaxation are selected to yield a film having desired properties, including a desired refractive index relationship. These variables are inter-dependent; thus, for example, a relatively low stretch rate could be used or coupled with, e.g., a relatively low stretch temperature. It will be apparent to one of ordinary skill how to select the appropriate combination of these variables to achieve a desired multi-layer device. In general, in the case of multilayer films that are in the form of polarizers, preferred stretch ratios are 1:2–10 (more preferably 1:3–7) along one axis and 1:0.5–1 (more preferably 1:1–7, most preferably 1:3–6) along a second axis. In the case of mirror films, it is generally preferred that the stretch ratio along both axes (which can be the same or different from one another) be in the range of 1:2–10 (more preferably 1:2–8, and most preferably 1:3–7).

Any known ultraviolet light absorbing compound can be suitable for incorporation into the light stabilizing compositions of the invention. Generally, however, in practice the most useful ultraviolet light absorbing compounds will include triazine compounds, and in particular hydroxy-functional tris-aryl triazine compounds. Generally, these compositions will correspond to the chemical formula:

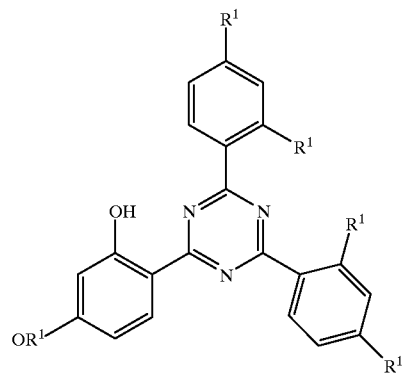

wherein each $R^1$ is the same or different and is selected from the group consisting of hydrogen and substituted or unsubstituted, branched or unbranched alkyl, aryl, or alkaryl groups having from 1 to about 18 carbon atoms. Preferably, the carbon chains of any such alkyl, aryl, or alkaryl group is free of interruption by one or more oxygen atoms and is not substituted by a hydroxy substituent.

Particularly preferred ultraviolet light absorbing compounds include 2,4-diphenyl-6-(2-hydroxy-4-hexyloxyphenyl)-s-triazine and 2,4-bis(2,4-dimethylphenyl)-6-(2-hydroxy-4-octyloxyphenyl)-s-triazine. Suitable ultraviolet absorbing compounds are available commercially, including, e.g., Cyasorb™ UV-1164, available from Cytec Technology Corporation of Wilmington, Del., and Tinuvin™ 1577, available from Ciba Specialty Chemicals of Tarrytown, N.Y.

Generally, the ultraviolet light absorbing compound (or "UVA" as it is sometimes called) is present in the light stable article in an amount between about 0.25 and about 5 percent by weight of the polyester film, preferably between about 0.5 and about 4 weight percent, even more preferably between about 1 and about 3 percent by weight.

Many hindered amine light stabilizing compositions (or "HALS") useful in the light stabilizing compositions of the invention are known in the art. Generally, the most useful HALS are those derived from a tetramethyl piperidine, and those that can be considered polymeric tertiary amines. Broadly, these include high molecular weight (i.e., above about 500), oligomeric, and polymeric compounds that contain a polyalkylpiperidine constituent, including polyesters, polyethers, polyamides, polyamines, polyurethanes, polyureas, polyaminotriazines and copolymers thereof. Preferred HALS compositions are those containing polymeric compounds made of substituted hydroxypiperidines, including the polycondensation product of a hydroxypiperidines with a suitable acid or with a triazine. A particularly preferred HALS compound is the polycondensation product of 1-(2-hydroxyethyl)-2,2,6,6-tetramethyl-4-hydroxypiperidine with succinic acid. Suitable HALS compositions are available commercially, for example, under the "Tinuvin" tradename from Ciba Specialty Chemicals Corporation of Tarrytown, N.Y. One such useful HALS composition is Tinuvin 622.

Generally, the hindered amine light stabilizing composition will be present in the light stable article in an amount between about 0.05 and about 1 percent by weight of the polyester film, preferably between about 0.1 and about 0.5 weight percent.

In accordance with some embodiments of the invention, one or more additional phosphonate stabilizing agents are incorporated into the polyester film. These agents can be added to the polyester either before or during the polymerization reaction or, alternatively, to the polyester resin prior to its extrusion or casting into film form. Phosphonate stabilizers can prove particularly useful to stabilize catalysts used during the polyester forming polymerization reaction. These catalysts, if left unstabilized, can degrade the polyester during extrusion and/or aging and lead to decreased melt stability and, ultimately, to increased haze. Any conventional phosphonate stabilizer is considered useful in the practice of the invention. Triethyl phosphono acetate ("TEPA") is preferred and is available commercially from Albright & Wilson Co. of Glen Allen, Va. Typically, the phosphonate stabilizer will be added at levels less than about 0.25 weight percent, preferably less than about 0.1 weight percent, and more preferably between about 0.025 and 0.075 percent by weight.

One or more additional additives known generally in the art can further be incorporated into the articles of the invention. These would include, for example, lubricants and other melt processing aids, pigments, dyes and other colorants, supplemental ultraviolet light stabilizers, antioxidants, nucleating agents, fillers, plasticizers, whitening agents, flame retardants, antistatic and slip agents, and the like.

An effective amount of the light stabilizing composition can be incorporated into the light stable article comprising the polyester film in any manner that facilitates the ability of the composition to retard deleterious effects of exposure to unwanted radiation, in particular ultraviolet radiation. The light stabilizing compositions can, for example, be incorporated along with any additional additives and adjuvants directly into the polyester resin either before, during or after its formation into a polyester film. Such incorporation can take place using any conventional method of mixing or dispersing additives into a polymer resin or film, such as by milling or extrusion.

The light stable articles, in their most essential form, constitute at least one single or multilayer polyester film used alone or in combination with a suitable substrate. The polyester film can itself include one or more additional polyester or non-polyester layers. For example, at least one additional surface layer can be placed in contact with at least one outer surface of the polyester film to form a composite film construction. This surface layer can act to reduce the surface roughness of the overall construction and maintain the clarity and low haze of the optical body. These surface, or "skin," layers can be coextruded onto one or both outer surfaces of the polyester core, or the skin layers can be coated or laminated onto the polyester core film using a suitable pressure sensitive or non-pressure sensitive adhesive. The polyester film constructions of the invention can also include one or more coatings, such as hardcoats, adhesives, antistatics, adhesion promoting primers, additional ultraviolet stabilizing coatings, etc. It will be understood, however, that the light stabilizing compositions themselves can be incorporated into the polyester film or into one or more additional layers or components making up the composite article. The light stable articles can be used in any application that requires increased resistance to weathering. Generally, the articles will exhibit no significant deterioration (e.g., no noticeable or objectionable change in color) for at least three years, preferably at least five years, upon exposure to outdoor conditions.

Typically, the light stable articles can incorporate or be applied to other optical articles or films to combine multiple optical effects. For example, the articles can be incorporated along with one or more additional optically active layers to form a retroreflective sign or article, an IR mirror, a protective overlay (for, e.g., commercial graphics applications), a UV absorption construction, or a solar control construction, polarizer, or decorative construction. Pigmented articles of the invention can also be used to tint automotive or window glazings, such as glass or polycarbonates. Pigmented and non-pigmented optical bodies find application in the construction of puncture or tear-resistant films, safety and security films, and as contrast enhancement layers for optical displays such as computer monitors, television screens, and the like.

One particularly useful article construction includes a retroreflective base sheeting and the light stable article. For example, the light stable article comprising the polyester film can be overlaid on the retroreflective base sheeting to provide a road or traffic signage material or a similar article with improved weathering properties. Such a base sheeting can be rendered retroreflective, for example, by forming retroreflective elements on one side of a composite article or, alternatively, by attaching a retroreflective base sheet to the composite construction by means of a transparent adhesive or by direct lamination. The retroreflective composite structure may also comprise or include a member with cube corner retroreflective elements or may comprise or include a microsphere-based retroreflective structure (e.g., a monolayer of transparent microspheres and reflective means). Useful retroreflective articles would include those of both rigid and flexible form.

The following examples are offered to aid in the understanding of the present invention and are not to be construed as limiting the scope thereof. Unless otherwise indicated, all parts and percentages are by weight.

EXAMPLES

Two polyester resins were prepared for use in the Examples. Both were prepared in batch reactors using Ethylene Glycol and Dimethyl Terephthalate as starting materials. The first resin, designated PET-A, was made using 0.02% by weight Cobalt Acetate, 0.02% by weight Zinc Acetate, and 0.03% by weight Antimony Triacetate as catalysts. PET-A also contained 0.04% by weight Triethyl Phosphono Acetate (TEPA) obtained from Albright and Wilson Co., Glen Allen, Va., USA. TEPA is believed to serve as a catalyst scavenger during subsequent extrusion processing, stabilizing the resin and preventing formation of chemically reactive sites on the polymer chains. The second resin, designated PET-B, was made using 0.05% by weight Manganese Acetate and 0.07% by weight Antimony Triacetate as catalysts, and 0.05% by weight TEPA.

Several different Ultraviolet Absorbers ("UVAs") were obtained for use in the examples. Bis-2(4-benzoyl-3-hydroxyphenoxyethyl)ether, "UVA-1", was prepared in-house. 2,2'-methylenebis(6-(2H-benzotriazol-2-yl)-4-1,1, 3,3-tetramethylbutyl)phenol) (TINUVIN™ 360), 2-(2-Hydroxy-3,5-di(1,1-dimethylbenzyl)phenyl)-2H-benzotriazole (TINUVIN™ 900), 2-(2-Hydroxy-3-dimethylbenzyl-5-(1,1,3,3-tetramethylbutyl)phenyl)-2H-benzotriazole (TINUVIN™ 928), and 2-(4,6-Diphenyl-1,3,5-triazin-2-yl)-5-((hexyl)oxyl-phenol) (TINUVIN™ 1577) were obtained from Ciba Specialty Chemicals Corp., Tarrytown, N.Y., USA. 2-(4,6-Bis(2,4-dimethylphenyl)-1,3,5-triazin-2-yl)-5-(octyloxy)phenol (CYASORB™ UV-1164) and 2,2'-(1,4-Phenylene)bis(4H-3,1-benzoxazin-4-one) (CYASORB™ UV-3638) were obtained from Cytec Industries, Inc., West Paterson, N.J., USA.

Several different Hindered Amine Light Stabilizers ("HALS") were obtained for use in the Examples. Butanedioic acid, dimethylester, polymer with 4-hydroxy-2,2,6,6-tetramethyl-1-piperidine ethanol (TINUVIN™ 622), bis(2, 2,6,6-Tetramethyl-4-piperidinyl)sebacate (TINUVIN™ 770), 1,3,5-Triazine-2,4,6-triamine, N,N'''-(1,2-ethane-diyl-bis(((4,6-bis-(butyl(1,2,2,6,6-pentamethyl-4-piperidinyl)amino)-1,3,5-triazine-2-yl)imino)-3,1-propanediyl))bis(N', N''-dibutyl-N',N''-bis(1,2,2,6,6pentamethyl-4piperidinyl)-) (CHIMASSORB™ 119), and Poly((6-((1,1,3,3-tetramethylbutyl)amino)-s-triazine-2,4-diyl)((2,2,6,6-tetramethyl-4-piperidyl)imino))hexamethylene((2,2,6,6-tetramethyl-4-piperidyl)imino) (CHIMASSORB™ 944) were all obtained from Ciba Specialty Chemicals Corp., Tarrytown, N.Y., USA.

Accelerated UV weathering studies were performed on films of the examples using techniques similar to those described in ASTM G-151, "Standard Practice for Exposing Nonmetallic Materials in Accelerated Test Devices That Use Laboratory Light Sources." Other techniques could be used alternatively. The particular technique used is thought to be an excellent predictor of outdoor durability, i.e., ranking materials' performance correctly. The technique involves following the absorbance at 350 nm wavelength with respect to time of exposure. An extrapolation of a plot of absorbance vs. time is made to predict the time at which absorbance would fall to a level of A=1.00, and this time is recorded as the "Accelerated UV Weathering Time." Observation over time has indicated that outdoor material useful lifetimes are roughly ten to fifteen times the values given by our accelerated UV weathering test.

Another measure of the UV-weatherability of polymer films is the retention of gloss upon exposure to UV radiation. This method, too, provides a relative ranking of similar materials, based upon the retention (as a percentage) of each material's original gloss level when exposed to the same dose of radiation. The Gloss Retention test employs fluorescent UV exposure according to ASTM G-53, using UVA 340 lamps. Tests were conducted to a radiant exposure of 1008 $MJ/m^2$ at 340 nm. Values reported in Tables 3 and 4 represent the final gloss as a percent of the gloss measured before exposure.

Examples 1–4

Four of the UVAs were evaluated in PET-B extrusion studies utilizing a twin-screw extruder and a station for casting unstretched webs. The cast webs were then stretched into biaxially oriented films of approximately 25 to 50 microns thickness, using a laboratory biaxial film stretching device. The stretching device was a custom-built instrument using a pantograph mechanism similar to that found in commercial instruments of its kind, such as the film stretchers available from T. M. Long Co. The films were evaluated subjectively on an A-B-C scale, with A signifying the best qualities and C signifying the worst. The films were evaluated for the amount of absorbance at 320 nm wavelength, the ability of the UVA to withstand temperatures of 290° C., the solubility of the UVA in the resin, and lack of yellowness. Table 1 summarizes the results.

TABLE 1

| Example | UVA | Absorbance (320 nm) | Performance (290° C.) | Solubility | Yellowness |
|---|---|---|---|---|---|
| 1 | Cyasorb 1164 | A | A | A | B |
| 2 | Cyasorb 3638 | A | A | C | A |
| 3 | Tinuvin 900 | C | C | C | A |
| 4 | UVA-1 | B | B | B | C |

Examples 5–19

For Examples 5–19, films were made on a continuous pilot-plant-sized sequential biaxial orientation film manufacturing line. A 40 mm twin screw extruder, equipped with high shear mixing screws to enhance mixing of the polymer and additives, was used. A twin screw powder feeder was used to meter the additives to the extruder. A film die having manual die bolt adjustments was used. A chilled (20° C.) casting wheel was used. Electrostatic pinning was used to aid in quenching the cast web and providing even caliper. The cast web was stretched in the machine direction using a length orienter having preheating rolls and IR heating in the stretching gap. Transverse direction stretching and heat setting was performed in a tenter oven. In Examples 5–11, several loading levels of several UVAs were examined. In Examples 12–15, several HALS additives were examined to determine their melt-processability with PET into clear films. In Examples 16–19, several UVA/HALS combinations were examined. The results are summarized below in Tables 2 & 3.

TABLE 2

| Example | PET Type | UVA | Loading (wt %) | HALS Additive | Loading (wt %) | Appearance |
|---|---|---|---|---|---|---|
| 5 | PET-A | Cyasorb 1164 | 2.0 | None | 0 | Good |
| 6 | PET-B | Cyasorb 1164 | 1.0 | None | 0 | Good |
| 7 | PET-B | Cyasorb 1164 | 2.0 | None | 0 | Good |
| 8 | PET-B | Tinuvin 928 | 2.0 | None | 0 | Good |
| 9 | PET-B | Tinuvin 928 | 3.0 | None | 0 | Good |
| 10 | PET-B | Tinuvin 360 | 2.0 | None | 0 | Good |
| 11 | PET-B | Tinuvin 360 | 3.0 | None | 0 | Good |
| 12 | PET-B | none | 0 | Tinuvin 622 | 0.5 | Good |
| 13 | PET-B | none | 0 | Tinuvin 622 | 1.0 | Good |
| 14 | PET-B | none | 0 | Chimassorb 119 | 0.5 | Hazy |
| 15 | PET-B | none | 0 | Chimassorb 944 | 0.5 | Hazy |
| 16 | PET-B | Cyasorb 1164 | 2.0 | Tinuvin 622 | 0.25 | Good |
| 17 | PET-B | Cyasorb 1164 | 1.0 | Tinuvin 622 | 0.5 | Good |
| 18 | PET-B | Tinuvin 360 | 2.0 | Tinuvin 622 | 0.25 | Good |
| 19 | PET-B | Tinuvin 360 | 2.0 | Tinuvin 622 | 0.50 | Good |

TABLE 3

| Example | Acc'd UV Weathering Test (hrs.) | Gloss Retention (%) |
|---|---|---|
| 5 | 3000 | 92 |
| 6 | 2000 | 94 |
| 7 | 4500 | 94 |
| 8 | 1000 | 74 |
| 9 | 1500 | 77 |
| 10 | 2000 | 98 |
| 11 | 3000 | 91 |
| 12 | — | — |
| 13 | — | — |
| 14 | — | — |
| 15 | — | — |
| 16 | 4500 | 92 |
| 17 | 1000 | 93 |
| 18 | 1500 | 84 |
| 19 | 1500 | 89 |

Examples 20–24

Three additional films were made on a different film manufacturing line than that used in Examples 5–19. Resin PET-A was used. Similar film-making conditions were employed. The film of Example 20 contained 2.0% by weight Cyasorb 1164 and 0.25% by weight Tinuvin 622. The film of Example 21 contained only 2.0% by weight of Cyasorb 1164. The film of Example 22 contained 2.2% by weight of UVA-1 in Resin PET-A. For Examples 23, a commercially available UV-stabilized PET film was obtained; Courtgard UV-SR (Courtaulds Performance Films, Martinsville, Va., USA). The Accelerated UV Weatherability performance of these films is summarized in Table 4.

TABLE 4

| Example | Description | Accelerated UV Weathering Test (Hrs.) | Gloss Retention (%) |
|---|---|---|---|
| 20 | 2% C.1164/0.25% T.622 | 4000 | 88 |
| 21 | 2% C.1164 | 3500 | — |
| 22 | 2.2% UVA-1 | 2000 | 91 |
| 23 | Courtaulds Courtgard UV-SR | 1000 | — |

Examples 25–29

Examples 25–29 were made using an additional technique for monitoring the UV stability of PET films that measures the optical density ("OD") of the film at a proscribed wavelength, in these examples 450 nm. As unprotected PET films are subjected to UV light, the optical density of the film grows rapidly at wavelengths around 425–500 nm. Objectionable film appearance, as evidenced by haze formation and a loss in gloss, typically is observed when the film reaches an optical density of 0.15 at 450 nm.

In Examples 25–29 a series of films were produced using resin PET-B in a similar fashion to that described above for Examples 1–4. The samples and their corresponding accelerated weathering results are provided in Table 5 below.

TABLE 5

| Example | UVA (wt %) | HALS (wt %) | Hours of Accelerated Weathering to Reach OD of 0.15 at 450 nm |
|---|---|---|---|
| 25 | None | None | 690 |
| 26 | 2% Tinuvin 1577 | None | 1290 |
| 27 | 2% Tinuvin 1577 | 1% Tinuvin 770 | 1690 |
| 29 | 2% Tinuvin 1577 | 1% Tinuvin 622 | >1750 |

Various modifications and alterations of this invention will be apparent to those skilled in the art without departing from the scope and spirit of this invention, and it should be understood that this invention is not limited to the illustrative embodiments set forth herein.

We claim:

1. A light stable article comprising at least one single or multiple layer polyester film and an effective amount of a light absorbing composition comprising an ultraviolet light absorbing compound and a hindered amine light stabilizer (HALS) composition, wherein the weight ratio of the light absorbing compound to the HALS composition is at least about 2:1, and wherein the ultraviolet light absorbing compound is a hydroxy-functional tris-aryl triazine is of the formula:

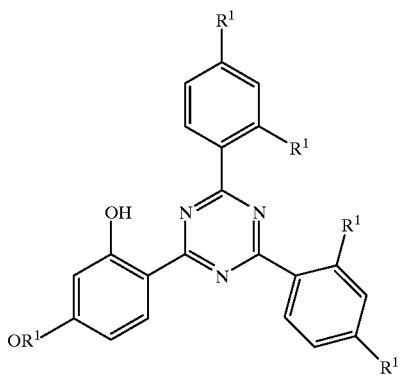

wherein each $R^1$ is the same or different and is selected from the group consisting of hydrogen and substituted or unsubstituted, branched or unbranched alkyl, aryl, or alkaryl groups having from 1 to about 18 carbon atoms, with the proviso that the carbon chain of any such alkyl, aryl or alkaryl group is not interrupted by an oxygen atom and is not substituted with a hydroxyl substituent.

2. The article of claim 1 wherein the ultraviolet light absorbing compound is 2,4-bis(2,4-dimethylphenyl)-6-(2-hydroxy-4-octyloxyphenyl)-s-triazine.

3. The article of claim 1 wherein the ultraviolet light absorbing compound is 2,4-diphenyl-6-(2-hydroxy-4-hexyloxyphenyl)-s-triazine.

4. The article of claim 1 wherein the HALS composition is derived from a tetramethyl piperidine.

5. The article of claim 1 wherein the HALS composition comprises butanedioic acid, dimethylester, polymer with 4-hydroxy-2,2,6,6-tetramethyl-1-piperidine ethanol.

6. The article of claim 1 wherein the ultraviolet light absorbing compound is a hydroxy-functional tris-aryl triazine and the HALS composition is derived from a tetramethyl piperidine.

7. The article of claim 1 wherein the ultraviolet light absorbing compound is 2,4-bis(2,4-dimethylphenyl)-6-(2-hydroxy-4-octyloxyphenyl)-s-triazine and the HALS composition comprises butanedioic acid, dimethylester, polymer with 4-hydroxy-2,2,6,6-tetramethyl-1-piperidine ethanol.

8. The article of claim 1 wherein the article exhibits no significant environmental deterioration upon outdoor exposure for at least three years.

9. The article of claim 1 wherein said light absorbing composition further comprises at least one phosphonate stabilizing compound.

10. The article of claim 1 wherein the ultraviolet light absorbing compound is present in an amount between about 0.5 and about 4 weight percent, and the HALS composition is present between about 0.05 and about 1.0 weight percent.

11. The article of claim 1 wherein said polyester film comprises terephthalate monomer units.

12. The article of claim 1 wherein said polyester film comprises naphthalate monomer units.

13. The article of claim 1 wherein said polyester film comprises a polyester selected from the group consisting of polyethylene naphthalate, polyethylene terephthalate, polycarbonates, polyarylates, polybutylene naphthalate, polypropylene naphthalate, polybutylene terephthalate, polypropylene terephthalate, and blends and copolymers of any of the above with each other or with other polymers.

14. The article of claim 1 wherein the polyester film is oriented.

15. The article of claim 1 wherein said article comprising the polyester film is a multilayer optical film.

16. The article of claim 1 wherein the article is rendered retroreflective.

17. An infrared mirror comprising the article of claim 1.

18. A window film comprising the article of claim 1.

19. A puncture resistant film comprising the article of claim 1.

20. A solar control film comprising the article of claim 1.

21. A security film comprising the article of claim 1.

22. A protective overlay film comprising the article of claim 1.

23. A contrast enhancement film comprising the article of claim 1.

24. A light stable article comprising at least one single or multiple layer polyester film having dispersed therein an effective amount of each of a light absorbing composition comprising at least one ultraviolet light absorbing compound and a phosphonate stabilizing compound, wherein the ultraviolet light absorbing compound is a hydroxy-functional tris-aryl triazine is of the formula:

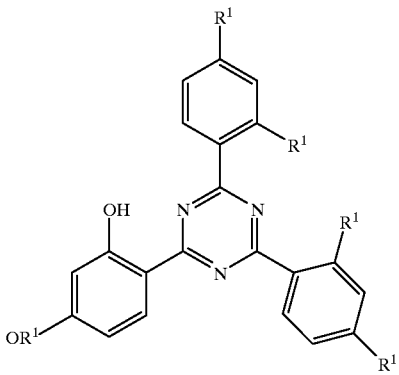

wherein each $R^1$ is the same or different and is selected from the group consisting of hydrogen and substituted or unsubstituted, branched or unbranched alkyl, aryl, or alkaryl groups having from 1 to about 18 carbon atoms, with the proviso that the carbon chain of any such alkyl, aryl or alkaryl group is not interrupted by an oxygen atom and is not substituted with a hydroxyl substituent.

25. The article of claim 24 wherein the ultraviolet light absorbing compound is 2,4-bis(2,4-dimethylphenyl)-6-(2-hydroxy-4-octyloxyphenyl)-s-triazine.

26. The article of claim 24 wherein the ultraviolet light absorbing compound is 2,4-diphenyl-6-(2-hydroxy-4-hexyloxyphenyl)-s-triazine.

27. The article of claim 24 wherein the phosphonate stabilizing compound is triethyl phosphono acetate.

28. The article of claim 24 wherein the ultraviolet light absorbing compound is present in an amount between about 0.5 and about 4 weight percent, and the phosphonate stabilizing compound is present in an amount less than about 0.25 weight percent.

29. The article of claim 24 wherein the light stabilizing composition further comprises a hindered amine light stabilizer (HALS) composition.

30. The article of claim 29 wherein the HALS composition is derived from a tetramethyl piperidine.

31. The article of claim 29 wherein the HALS composition comprises butanedioic acid, dimethylester, polymer with 4-hydroxy-2,2,6,6-tetramethyl-1-piperidine ethanol.

32. The article of claim 24 wherein said polyester film comprises terephthalate monomer units.

33. The article of claim 24 wherein said polyester film comprises naphthalate monomer units.

34. The article of claim 24 wherein said polyester film comprises a polyester selected from the group consisting of polyethylene naphthalate, polyethylene terephthalate, polycarbonates, polyarylates, polybutylene naphthalate, polypropylene naphthalate, polybutylene terephthalate, polypropylene terephthalate, and blends and copolymers of any of the above with each other or with other polymers.

35. The article of claim 24 wherein the polyester film is oriented.

36. The article of claim 24 wherein said article comprising the polyester film is a multilayer optical film.

37. The article of claim 24 wherein the article is rendered retroreflective.

38. An infrared mirror comprising the article of claim 24.

39. A window film comprising the article of claim 24.

40. A puncture resistant film comprising the article of claim 24.

41. A solar control film comprising the article of claim 24.

42. A security film comprising the article of claim 24.

43. A protective overlay film comprising the article of claim 24.

44. A contrast enhancement film comprising the article of claim 24.

* * * * *

UNITED STATES PATENT AND TRADEMARK OFFICE
CERTIFICATE OF CORRECTION

PATENT NO. : 6,613,819 B2
DATED : September 2, 2003
INVENTOR(S) : Johnson, Stephen A.

It is certified that error appears in the above-identified patent and that said Letters Patent is hereby corrected as shown below:

Column 5,
Line 32, delete "of a hydroxypiperidines" and insert in place thereof -- of hydroxypiperidines --.

Column 7,
Line 55, delete "(1,2,2,6,6pentamethyl-4piperidinyl)" and insert in place thereof -- (1,2,2,6,6-pentamethyl-4-piperidinyl) --.
Line 59, delete "imino)" and insert in place thereof -- imino)) --.

Column 8,
Lines 3, 4, 5, 34 and 40, delete "absorbance" and insert in place thereof -- absorptance --.

Column 9,
Lines 40, delete "Examples 20-24" and insert in place thereof -- Examples 20-23 --.

Column 10,
Lines 20, 23 and 34, delete "Examples 25-29" and insert in place thereof -- Examples 24-27 --.
Line 46, delete "25" and insert in place thereof -- 24 --.
Line 47, delete "26" and insert in place thereof -- 25 --.
Line 48, delete "27" and insert in place thereof -- 26 --.
Line 49, delete "29" and insert in place thereof -- 27 --.
Line 66, delete "triazine is of" and insert in place thereof -- triazine of --.

UNITED STATES PATENT AND TRADEMARK OFFICE
CERTIFICATE OF CORRECTION

PATENT NO.    : 6,613,819 B2
DATED         : September 2, 2003
INVENTOR(S)   : Johnson, Stephen A.

It is certified that error appears in the above-identified patent and that said Letters Patent is hereby corrected as shown below:

<u>Column 12,</u>
Line 20, delete "is".

Signed and Sealed this

Sixth Day of April, 2004

JON W. DUDAS
*Acting Director of the United States Patent and Trademark Office*